United States Patent
Liu et al.

(10) Patent No.: US 7,433,349 B2
(45) Date of Patent: *Oct. 7, 2008

(54) AUTOMATIC COMPILING OF ADDRESS FILTER INFORMATION

(75) Inventors: Jun Liu, Redmond, WA (US); John M. Parchem, Seattle, WA (US); Daniel J. Shoff, Issaquah, WA (US); Soemin Tjong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 482 days.

This patent is subject to a terminal disclaimer.

(21) Appl. No.: 11/050,578

(22) Filed: Feb. 3, 2005

(65) Prior Publication Data

US 2005/0157733 A1 Jul. 21, 2005

Related U.S. Application Data

(63) Continuation of application No. 09/371,916, filed on Aug. 10, 1999, now Pat. No. 6,889,258.

(60) Provisional application No. 60/122,859, filed on Mar. 4, 1999.

(51) Int. Cl.
*H04L 12/56* (2006.01)
*H04L 12/28* (2006.01)

(52) U.S. Cl. .................. 370/351; 370/360; 370/389; 370/396; 370/401; 709/225; 709/227; 709/245; 709/250; 725/105; 725/111

(58) Field of Classification Search ................. 370/465, 370/466, 467, 389, 428, 411–419, 401, 469, 370/220, 351, 360; 709/225, 227, 245, 250; 725/105, 111

See application file for complete search history.

(56) References Cited

U.S. PATENT DOCUMENTS

| 5,060,228 A |   | 10/1991 | Tsutsui et al. ............... 370/402 |
| 5,210,748 A |   | 5/1993 | Onishi et al. ................ 370/405 |
| 5,615,340 A | * | 3/1997 | Dai et al. ..................... 709/250 |
| 5,724,356 A | * | 3/1998 | Parameswaran Nair et al. ......................... 370/401 |
| 5,742,607 A |   | 4/1998 | Beighe et al. ............... 370/419 |

(Continued)

OTHER PUBLICATIONS

U.S. Appl. No. 09/371,916, filed Aug. 10, 1999, Jun Liu, et al.

(Continued)

*Primary Examiner*—Steven H. D Nguyen
*Assistant Examiner*—Jae Y Lee
(74) *Attorney, Agent, or Firm*—Workman Nydegger

(57) ABSTRACT

Automatic compilation of address filter information permits a cable modem to route incoming data packets to destination devices. A cable modem uses address filter information, such as for example, a list of addresses of communication devices that have previously registered with the cable modem, to identify incoming data packets that are addressed to communication devices associated with the cable modem. Incoming data packets with addresses that are not in the address filter information are filtered out. However, the cable modem may have insufficient filter information, when, for instance, a new communication device is associated with the cable modem. In order to automatically register communication devices associated with the cable modem, the cable modem inspects the source addresses of outgoing data packets. If the source address is not included in the address filter information, the source address is added.

17 Claims, 5 Drawing Sheets

U.S. PATENT DOCUMENTS

| | | | | |
|---|---|---|---|---|
| 5,809,252 | A | * | 9/1998 | Beighe et al. ............... 709/227 |
| 5,867,666 | A | | 2/1999 | Harvey ....................... 709/239 |
| 5,894,479 | A | | 4/1999 | Mohammed ............... 370/401 |
| 5,912,896 | A | | 6/1999 | Beighe et al. ............... 370/463 |
| 5,999,530 | A | | 12/1999 | LeMaire et al. ............ 370/390 |
| 6,061,798 | A | | 5/2000 | Coley et al. ................. 713/201 |
| 6,170,061 | B1 | | 1/2001 | Beser ..................... 416/244 R |
| 6,236,653 | B1 | | 5/2001 | Dalton et al. ............... 370/352 |
| 6,295,554 | B1 | | 9/2001 | Karadogan et al. .......... 709/219 |
| 6,307,837 | B1 | | 10/2001 | Ichikawa et al. ............ 370/230 |
| 6,370,147 | B1 | | 4/2002 | Beser ......................... 370/401 |
| 6,393,486 | B1 | | 5/2002 | Pelavin et al. ............... 709/238 |
| 6,421,728 | B1 | | 7/2002 | Mohammed et al. ........ 709/227 |
| 6,452,923 | B1 | | 9/2002 | Gerzberg et al. ............ 370/352 |
| 6,466,986 | B1 | | 10/2002 | Sawyer et al. ............... 709/245 |
| 6,480,488 | B1 | * | 11/2002 | Huang ........................ 370/389 |
| 6,484,210 | B1 | | 11/2002 | Adriano et al. ............. 709/239 |
| 6,571,338 | B1 | | 5/2003 | Shaio et al. ................. 713/201 |
| 6,618,386 | B1 | | 9/2003 | Liu et al. |
| 6,618,387 | B1 | | 9/2003 | Liu et al. ..................... 370/401 |
| 6,775,713 | B1 | | 8/2004 | Liu et al. ..................... 709/250 |
| 6,889,258 | B1 | * | 5/2005 | Liu et al. ..................... 709/245 |

OTHER PUBLICATIONS

Cerf, V., "The Catenet Model for Internetworking," Information Processing Technizues Office, Defense Advanced Research Projects Agency, IEN 48, Jul. 1978.

Bolt Beranek and Newman, "Specification for the Interconnection of a Host and an IMP," BBN Technical Report 1822, Revised May 1978.

Postel, J., "Internet Control Message Protocol—DARPA Internet Program Protocol Specification," RFC 792, USC/Information Sciences Institute, Sep. 1981.

Shoch, J., "Inter-Network Naming, Addressing, and Routing," COMPCON, IEEE Computer Society, Fall 1978.

Postel, J., "Address Mappings," RFC 796, USC/Information Sciences Institute, Sep. 1981.

Shoch, J., "Packet Fragmentation in Inter-Network Protocols," Computer Networks, v.3, n.1, Feb. 1979.

Strazisar, V., "How to Build a Gateway," IEN 109, Bolt Beranek and Newman, Aug. 1979.

Postel, J., "Service Mappings," RFC 795, USC/Information Sciences Institute, Sep. 1981.

Postel, J., "Assigned Numbers," RFC 790, USC/Information Sciences Institute, Sep. 1981.

"MCNS Data-Over-Cable Service Interface Specifications: Baseline Privacy Interface Specification SP-BPI-I02-990319," Mar. 1999.

"MCNS Data-Over-Cable Service Interface Specifications: Cable Modem to Customer Premise Equipment Interface Specification SP-CMCI-I04-000714," Jul. 2000.

"MCNS Data-Over-Cable Service Interface Specifications: Cable Modem Termination System—Network Side Interface Specification, SP-CMTS-NSII01-960702," Jul. 1996.

Ciciora, W., et al., "Protocol Issues," *Modern Cable Television Technology: Video, Voice, and Data Communications*, Section 4.4, pp. 194-205, Copyright 1999 by Morgan Kaufmann Publishers, Inc.

Ciciora, W., et al., "Chapter 4.5: The DOCSIS Protocol for Cable Modems," *Modern Cable Television Technology: Video, Boice, and Data Communications*, Section 4.5, pp. 205-213, Copyright 1999 by Morgan Kaufmann Publishers, Inc.

* cited by examiner

AUTOMATIC COMPILING OF ADDRESS FILTER INFORMATION

CROSS-REFERENCE TO RELATED APPLICATIONS

This application is a continuation of U.S. application Ser. No. 09/371,916, filed Aug. 10, 1999, and entitled, "Automatic Compiling of Address Filter Information," which claims the benefit of U.S. Provisional Application No. 60/122,859, filed Mar. 4, 1999, both of which are incorporated herein by reference in their entirety.

BACKGROUND OF THE INVENTION

1. The Field of the Invention

The present invention relates to electrical computers and data processing systems. Specifically, the present invention relates to a system and method for automatically compiling address filter information.

2. Background and Related Art

The Internet is a worldwide interconnection of networks over which computers can exchange information. Never before have human beings had access to so much information from the comfort of their own homes or offices. For Wide Area Networks (WANs) such as the Internet, a computer typically employs a modem to send information to and receive information from other connected computers. There are many types of modems each corresponding to a specific type of medium used to deliver this information.

One common modem uses Plain Old Telephone Service (POTS) to send and receive information. POTS modems have an advantage in that they use a transmission medium that is available by just connecting the modem with the nearest phone jack. Thus, the POTS modem does not require expensive capital investment to set up a connection to the Internet. Although POTS modems are easy and inexpensive to connect to the Internet, the transmission speeds available over plain old telephone service are relatively slow. Currently, POTS modems are capable of information exchange at up to only 56,000 bits per second (bps) or approximately 0.056 megabits per second (Mbps). While faster POTS modems may eventually become available, it is not currently anticipated that POTS modems can become significantly faster due to physical limitations in the telephone lines themselves.

Telephone companies are now offering services that bypass the relatively slow telephone lines to establish a more direct connection to the Internet. For example, T1 connections permit information exchange in the megabits per second (Mbps) range. T2 and T3 connections allow for even higher speed information exchange. Currently, T1, T2 and T3 connections respectively permit information exchange at approximately 1.544 Mbps, 6.312 Mbps and 44.736 Mbps. Although these direct T1, T2 and T3 connections permit information exchange orders of magnitude faster than is available over plain old telephone service, they are typically much more expensive to obtain and/or maintain than plain old telephone service since each connection requires dedicated circuitry. Furthermore, telephone companies typically provide both the plain old telephone service and the T1, T2 and T3 connections. To facilitate free market competition, it would be desirable for a consumer to have alternative suppliers of Internet access.

A cable modem is a device that hooks up to the Internet through a cable system provided by a cable operator. Assuming that the cable operator facilitates Internet access as many cable operators do, Internet access is obtained by plugging the cable modem into a cable connection that typically already exist (or may be readily installed) in many homes and business. Thus, the cost of connecting a cable modem to the Internet is relatively small compared to establishing T1, T2 and T3 connections since the extensive cable network that supports communication already exists. Thus, there is no need to establish extensive dedicated circuitry to support each new end user.

Furthermore, dialing into the Internet is not needed since data may be communicated to or from the end-user over the cable system without dialing into the cable system. Thus, the initial connection to the Internet is much faster compared to using plain old telephone service.

In addition, cable modems allow for much faster information exchange than is available over plain old telephone service. An individual cable modem end user may experience information exchange speeds of from 0.5 Mbps to 1.0 Mbps or more depending on the cable network architecture and traffic load. This represents a speed that is at least an order of magnitude faster than is currently available over plain old telephone service. Furthermore, cable information exchange speeds may be further increased due to future improvements in cable technology. Thus, cable modems provide a low cost, high-speed alternative for Internet access.

Typically, the cable networks are considered "open," meaning that any particular cable modem is likely to encounter some incoming data packets that are addressed to the computer system associated therewith and other data packets addressed to unrelated computer systems. The cable modem uses address filter information to filter the incoming data packets to allow passage for only those data packets that are addressed to the computer system associated with the cable modem.

This filtering avoids unnecessary processing of packets that are not addressed to the computer system associated with the cable modem. However, this filtering assumes that the cable modem is aware of the address of all of its associated computer systems. However, on occasion, the cable modem may not be aware of the correct address of an associated computer system. In this case, the packet addressed to that computer system would be filtered out by the cable modem, leaving the incoming message undelivered. Although the cable modem may possibly be manually reconfigured to accept packets addressed to the computer system, the user associated with the computer system may not ever know that a message was undelivered and so might remain unaware of the problem for quite some time.

In light of this difficulty with the prior art, there is a need for systems and methods for automatically correcting or updating address filter information. It would be advantageous if such systems and methods could be used to maintain current address filter information as a new computer is added to a group of locally networked computers that receive network services from a cable modem.

BRIEF SUMMARY OF THE INVENTION

The present invention relates to systems and methods for automatically compiling address filter information that permits a cable modem to appropriately route incoming data packets to destination computers. Cable modems are used to send and receive messages over wide area networks using cable networks. These cable networks are often "open" so that the cable modem encounters data packets addressed to its associated computer system as well as data packets addressed to unrelated computer systems on the cable network. Cable modems use address filter information to filter out those incoming data packets that are addressed to unrelated computer systems on a cable network. The cable modem only passes those packets addressed to its associated computer system.

The address filter information might be, for example, a list of addresses of communication devices that have previously registered with a processing device such as a bridging component associated with the cable modem. In the specification and the claims, a "communication device" is defined as any device potentially capable of sending data packets to and receiving data packets from a cable modem. Examples of "communication devices" include computers, set top boxes, and any other electronic device that has the capability of accessing data on the Internet or otherwise receiving or sending network data. If a packet has a destination address that matches one of the addresses, the cable modem will pass the packet to the computer system.

On occasion, the cable modem may have incorrect or insufficient filter information. For example, the cable modem may not know that a communication device has been connected to it. Alternatively, the cable modem may have an incorrect address for the communication device. In these cases, incoming data packets addressed to the communication device will be incorrectly filtered out by the cable modem leaving the message undelivered.

The present invention overcomes this problem. Specifically, a processing device (e.g., a bridging component) associated with the cable modem inspects the source address of any outgoing data packets to determine the address of the communication device that generated the outgoing data packet. The processing component might be, for example, a driver for the cable modem or a separate bridging component that interconnects the cable modem to a local area network. The processing component then compares the source address within the data packet with the address list of previously registered communication devices. If the address is not included within the list, the processing device has not previously registered the communication device that sent the data packet and has not previously recognized it as a destination device that is to receive incoming data packets via the cable modem. Thus, the address of the previously unregistered communication device is added to the list of addresses. Subsequently, the cable modem will pass incoming data packets destined for that previously unregistered communication device.

In the foregoing manner, the processing device associated with the cable modem is capable of automatically recognizing a new communication device that is to receive incoming data packets via the cable modem. When the new communication device first sends an outgoing data packet through the cable modem, its network address is added to the address filter of the cable modem. The user of the new communication device does not need to know or perform any particular manual address registration procedures to configure the cable modem to route incoming data packets to the new communication device.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
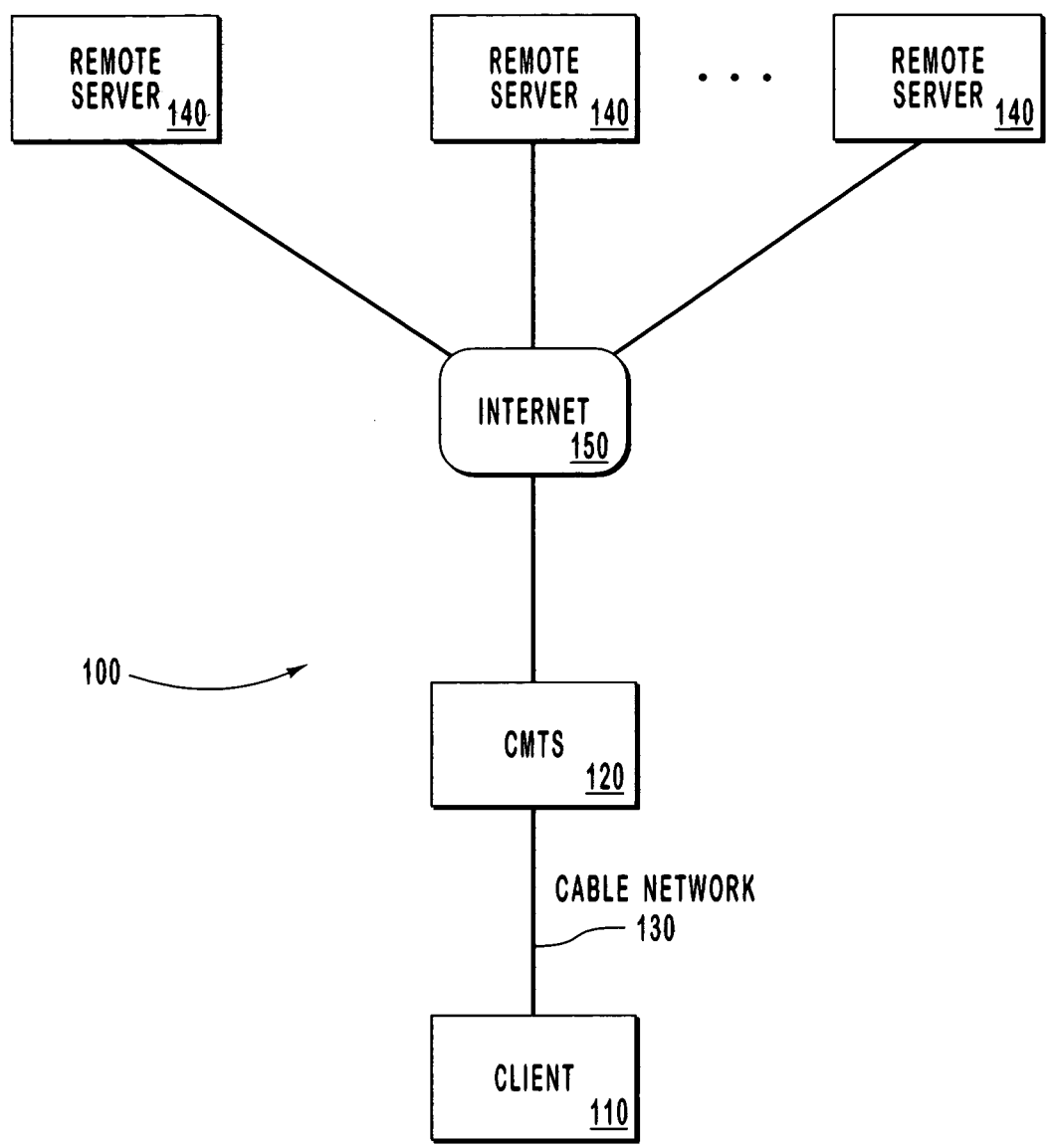
FIG. 1 is a schematic drawing of a network system that provides a suitable operating environment for the present invention.

The present invention relates to systems and methods for automatically compiling address filter information. Cable modems are used to send and receive messages over wide area networks using cable networks. These cable networks are typically maintained by cable operators and are often "open" so that the cable modem encounters data packets addressed to its associated communication devices as well as data packets addressed to unrelated communication devices on the cable network. Cable modems use address filter information to filter out those incoming data packets that are addressed to unrelated communication devices on a cable network. Instead, the cable modem only passes those packets addressed to its associated communication devices.

The present invention provides an automatic process whereby the network address of a new communication device logically connected to a cable modem is registered with a bridging component or other processing device associated with the cable modem. Specifically, the bridging component inspects the source address of outgoing data packets generated by an associated communication device. When a new communication device is first connected to a cable modem and is used to transmit an outgoing data packet, the bridging component or other processing component associated with the cable modem determines that the source address (i.e., the address of the new communication device) has not previously been encountered. In response, the bridging component adds the address as an acceptable destination address to the address filter information. Subsequently, the bridging component associated with the cable modem will recognize and pass any data packets having a destination address that is the same as the newly added address. Thus, the address filter information is quickly updated as soon as the bridging component processes an outgoing message from the relevant communication device.

In the following description, for clarity, numerous specific details are set forth in order to provide a thorough understanding of the invention. However, it will be evident to one skilled in the art that the present invention may be practiced without these specific details. In other instances, well-known structures and devices are shown in block diagram form in order to avoid obscuring the present invention.

Embodiments within the scope of the present invention include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. Thus, such a connection is also properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

FIG. 1 illustrates a configuration of a wide area network 100 that provides a suitable operating environment for the present invention. A client 110 is coupled to a Cable Modem Termination System (CMTS) 120 via a cable network 130. The cable network 130 is a distributed network that cable operators typically have used to provide television programming to customers. The CMTS 120 is also maintained by the cable operators and functions to communicate with a number of remote servers 140 (e.g., conventional Web servers) over a conventional network infrastructure, such as the Internet 150.

Outgoing messages destined for one of the remote servers 140 may be communicated by the client 110 over the cable network 130 to the CMTS 120. The CMTS 120 forwards the outgoing message over the Internet 150 to an appropriate remote server 140. In response, the remote server 140 generates an incoming message and transmits the incoming message over the Internet 150 to the CMTS 120. The CMTS 120 then uses the cable network 130 to forward the incoming message to the client 110. In this description and in the claims, an "outgoing" packet means a packet generated within the client 110 that is destined for either one of the remote servers 140 or a component within the client 110. An "incoming" packet means a packet generated by one of the remote servers 140 or the CMTS 120 that is destined for the client 110.

Figure 2:
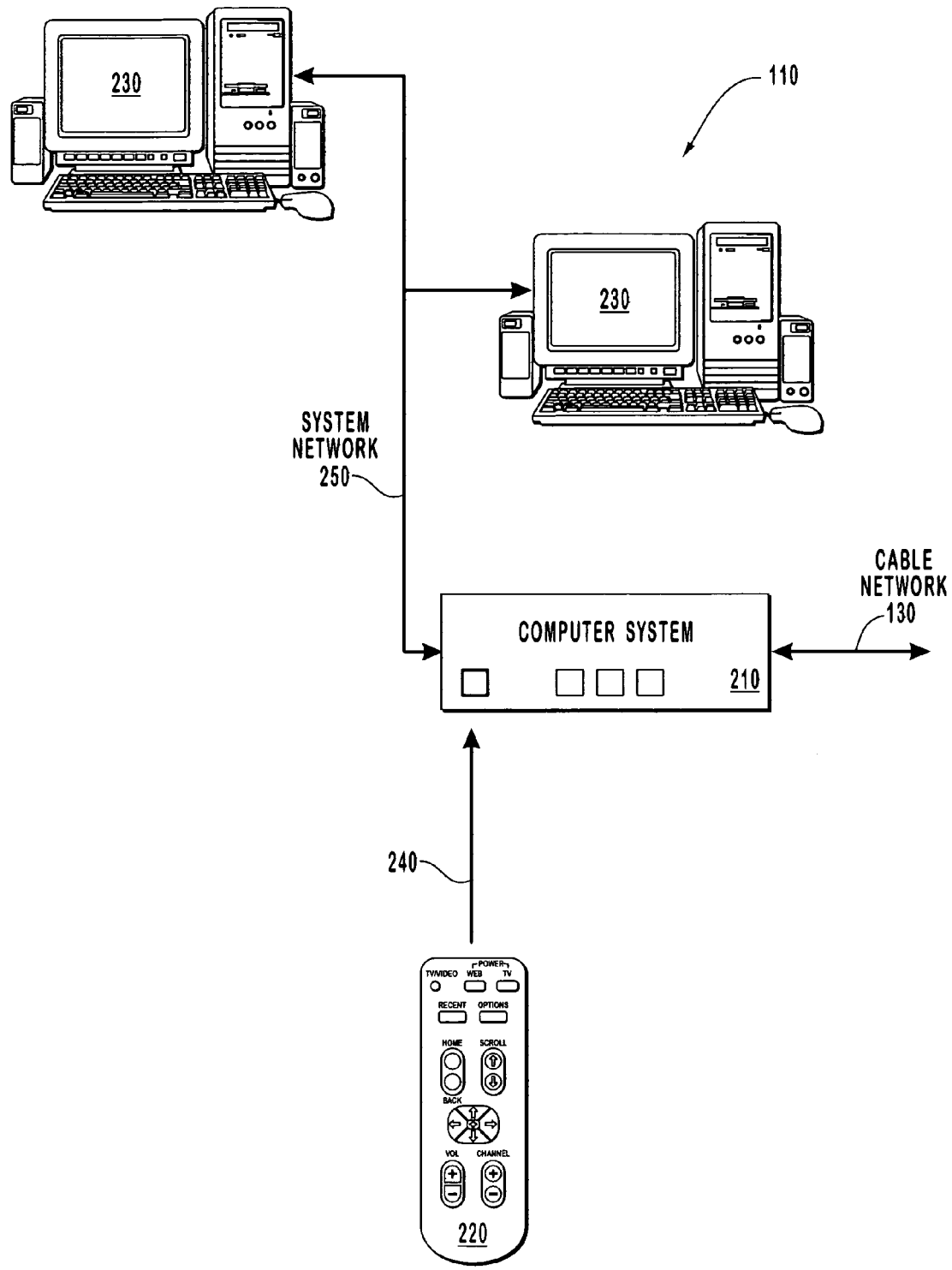
FIG. 2 is a schematic drawing of a client of FIG. 1 in which the present invention can be implemented.

FIG. 2 illustrates the client 110 of FIG. 1 in which embodiments of the present invention may be implemented. The client 110 includes a computer system 210, an input device 220, and one or more items of Customer Premises Equipment (CPE) 230.

The computer system 210 may be a set top box, a personal computer, a workstation, a network computer, or any other special purpose or general purpose computer system capable of performing the steps and acts of the present invention. In the specification and the claims, computer system 210 is also referred to as a "processing device" associated with a cable modem or bridging component. Computer system 210 includes a cable modem that, in one embodiment, is integrally or internally included in the computer system. In other embodiments, however, address filtering information can be automatically compiled for cable modems that are externally located with respect to its associated computer system.

The input device 220 may be any device capable of generating control information and passing that information to the computer system 210 over an input link 240. For example, the input device 220 may be a keyboard, a mouse, a joystick, a remote control, or the like. If the input device 220 is a remote control, for example, the input link 240 would be an Infrared (IR) link. The input device 220 may also be integrated with the computer system 210 as desired.

The computer system 210 is connected to one or more items of customer premises equipment 230. In this description and in the claims, "customer premises equipment" means electronic equipment capable of receiving electronic messages from the computer system 210. For example, the customer premises equipment 230 may include personal computers, television sets, set-top boxes, workstations, network computers, or other electronic equipment. Each of the items of customer premises equipment 230 represents a communication device that can communicate via a cable modem as disclosed herein. In addition, each item of customer premises equipment represents a communication device having a network address that can be automatically registered by a processing component associated with the cable modem according to the invention.

In operation, the computer system 210 sends information to and receives information from the CMTS 120 over the cable network 130 using a standard such as the well-known Data Over Cable Service Interface Specification (DOCSIS) 1.0 standard. This DOCSIS standard is managed by the Multimedia Cable Network System (MCNS), an organizations formed by major cable operators.

For incoming data from the cable network 130, depending on the network address provided with the incoming data, the computer system 210 either consumes the data itself, or passes the data to one or more of the items of customer premises equipment 230 over a system network 250. Although only one system network 250 is shown, the computer system 210 may use multiple system networks to communicate with customer premises equipment 230. For example, the system network 250 may be any medium capable of communicating information to and from the computer system 210 including one or more of an Ethernet, a Universal Serial Bus (USB), a fire wire (i.e. the IEEE 1394 standard), or any other equivalent medium.

For outgoing data to the cable network 130, the computer system 210 uploads data onto the cable network 130. The outgoing data was either generated internal to the computer system 210 or was received over the system network 250 from one of the items of customer premises equipment 230.

Figure 3:
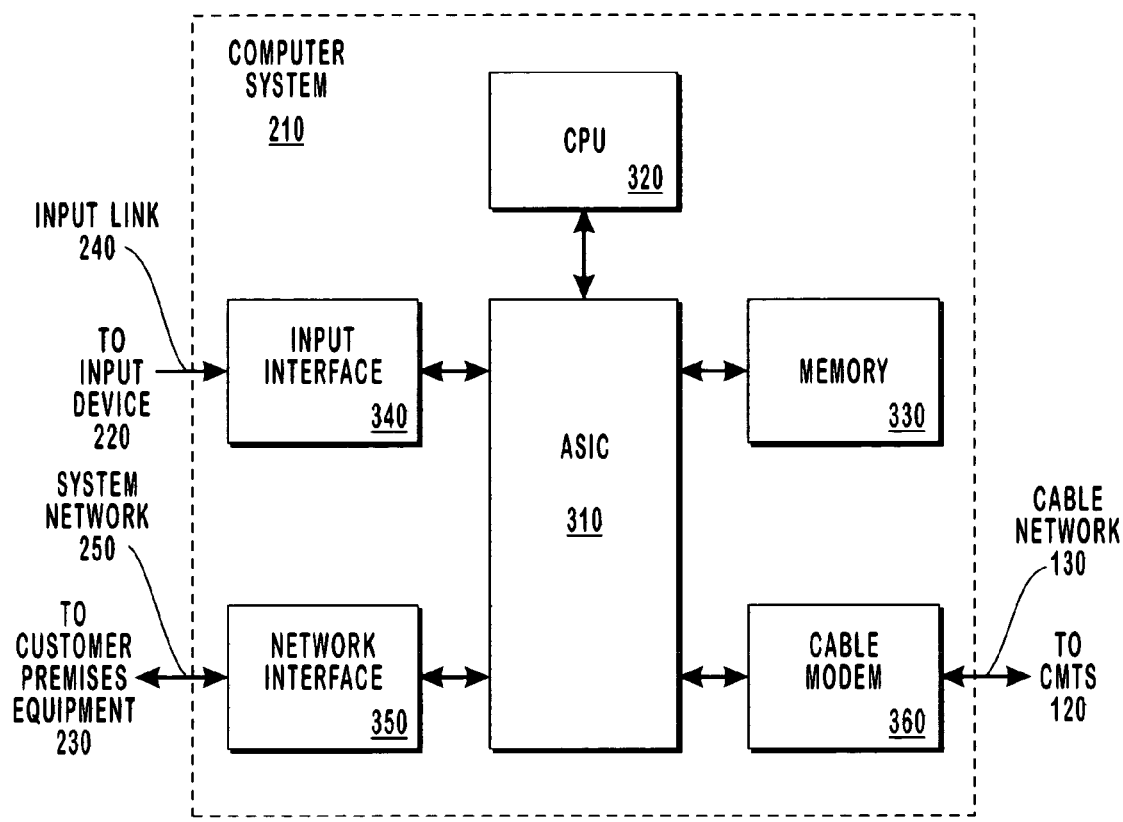
FIG. 3 is a schematic drawing of the physical internal components of the computer system of FIG. 2.

FIG. 3 shows the internal hardware components of the computer system 210 according to one embodiment of the invention. Operation of the computer system 210 is controlled by a Central Processing Unit (CPU) 320, which is coupled to an Application-Specific Integrated Circuit (ASIC) 310. The CPU 320 executes software designed to implement features of the present invention.

The software may be in the form of computer-executable instructions stored on a memory 330 writable and readable by the ASIC 310 and/or CPU 320. For example, the memory 330 may include one or more of a Random Access Memory (RAM), a Read-Only Memory (ROM), or any other circuit capable of reading and writing information to the ASIC 310 and/or the CPU 320.

An input interface 340 receives the control signals provided by the input device 220 over the input link 240. For example, if the input device 220 is a remote control, the input interface 340 is an IR interface.

Data from the system network 250 is provided to the computer system 210 via a network interface 350. Similarly, information from the computer system 210 is provided to the system network 250 over the network interface 350. The type of network interface 350 depends on the type of system network 250. For example, if the system network 250 is an Ethernet, the network interface 350 is an Ethernet card.

The data is received from and transmitted to the cable network 130 using a cable modem 360. The cable modem 360 can be compatible with the standard used to transmit data over the cable link such as the DOCSIS 1.0 standard.

Figure 4:
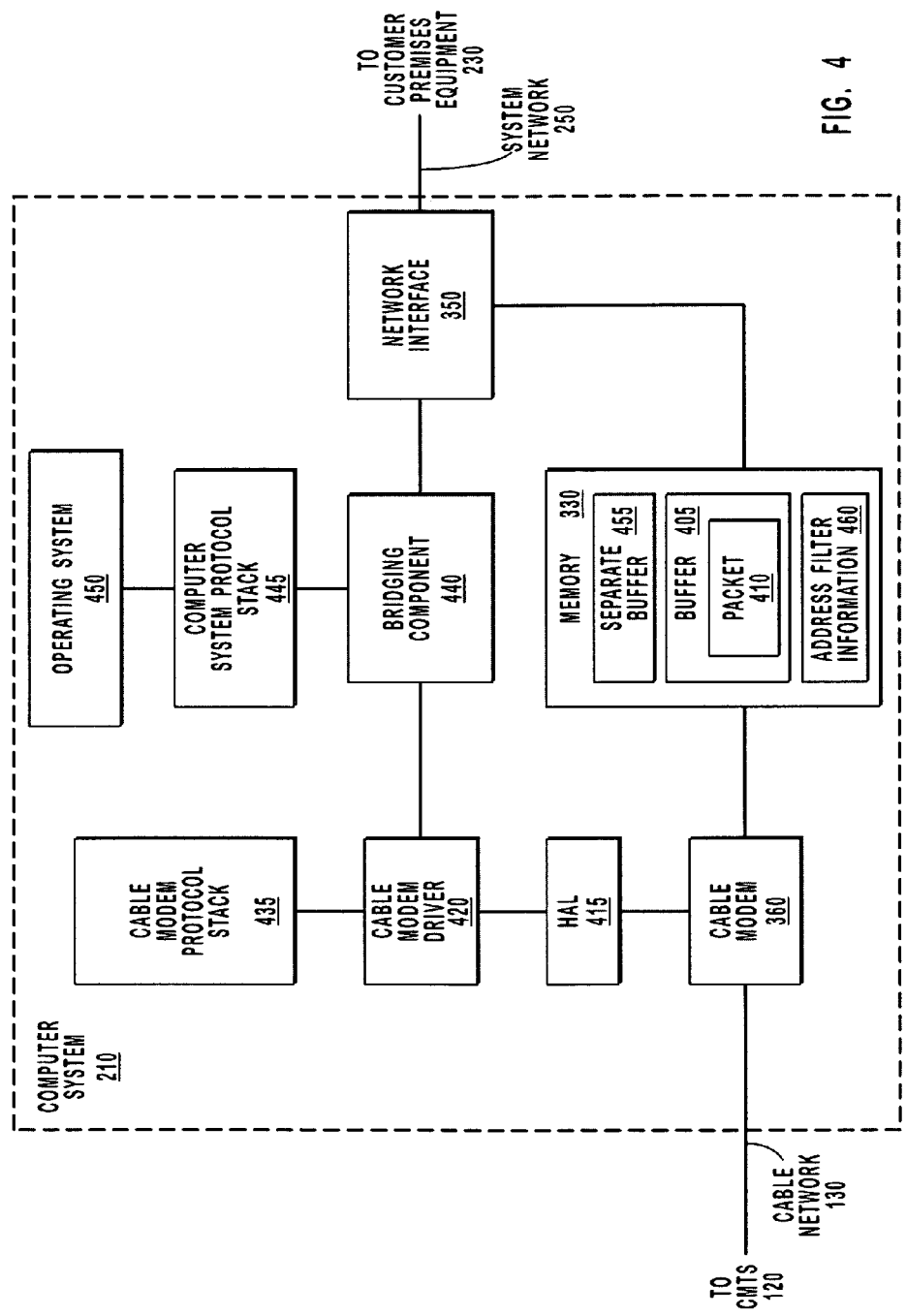
FIG. 4 is a schematic drawing of the physical and software communication components of the computer system of FIG. 2 and FIG. 3 in accordance with the present invention.

FIG. 4 is a schematic diagram of the communication components of the computer system 210 of FIG. 2. The memory 330, the network interface 350, and the cable modem 360 may be implemented in hardware. The Hardware Abstraction Layer (HAL) 415, the cable modem driver 420 (also called "the processing component"), the cable modem protocol stack 435, the bridging component 440, the computer system protocol stack 445, and the operating system 450 will be described as being executed as software modules. However, one skilled in the art will recognize that these units may be implemented in hardware, or by a combination of software and hardware.

The structure of the computer system 210 may best be understood by describing how the computer system 210 processes incoming and outgoing data. Data packets configured, for example, according to the DOCSIS 1.0 standard, include a source address and a destination address. Thus, an outgoing data packet being sent from a communication device logically connected with the cable modem 360 to the CMTS 120 (FIG. 1) has the address of that communication device as the source address. Conversely, an incoming data packet has the address of the destination device (e.g., the communication device) as the destination address.

If an incoming data packet has a destination address corresponding to the cable modem 360, the computer system 210, or one of the customer premises equipment 230, the cable modem 360 allows the incoming data packet to be delivered to its destination. Specifically, data packets for the cable modem 360 are routed up through the cable modem protocol stack 435. The data packets for the computer system 210 are routed up through the computer system protocol stack 445 to the operating system 450. The data packets for the customer premises equipment 230 are routed through the network interface 350, over the system network 250 to the appropriate item of customer premises equipment 230. A method of processing an incoming data packet, which can be used with the cable modems and networks disclosed herein, is further described in commonly-owned, U.S. patent application Ser. No. 09/371,914 (now U.S. Pat. No. 6,618,386), entitled "Hosting a Cable Modem in a Computer using a Virtual Bridge", filed on the same date as the present application, which is incorporated herein by reference in its entirety.

Unlike incoming data packets, the outgoing data is generated internal to the client 110. For example, the source of the outgoing data may be the cable modem protocol stack 435, the operating system 450, or the customer premises equipment 230. If the source of the outgoing data is the cable modem protocol stack 435, the outgoing data is passed through the cable modem driver 420, through the hardware abstraction layer (HAL) 415, and to the cable modem 360 for transmission over the cable network 130.

Hardware abstraction layer 415 establishes a standardized interface by which cable modem driver 420 and cable modem 360 communicate one with another. Further details of hardware abstraction layers for use with the present invention are described in commonly-owned, U.S. patent applications Ser. No. 09/371,915 (now U.S. Pat. No. 6,618,387), entitled "Interface for Abstracting Control of a Cable Modem", and Ser. No. 09/371,419 (now U.S. Pat. No. 6,775,713), entitled "Application Program Interface for Abstracting Control of a Cable Modem" both of which have been filed on the same date as the present application and are incorporated herein by reference.

Although messages can be generated within the cable modem protocol stack 435, the present invention is typically implemented when the source of the outgoing data is either the operating system 450 or one of the items of customer premises equipment 230. In either case, the outgoing data packet passes through bridging component 440. For instance, bridging component 440 can recognize computer system 210 (i.e., operating system 450) as a yet unregistered communication device when cable modem driver 420 has just been installed in the computer system 210 and is being used for the first time to transmit outgoing data packets from operating system 450 and protocol stack 445. Bridging component 440 can recognize each item of customer premises equipment 230 as a yet unregistered communication device when the item of customer premises equipment has just been networked with computer system 210 and is being used for the first time to transmit outgoing data packets.

Figure 5:
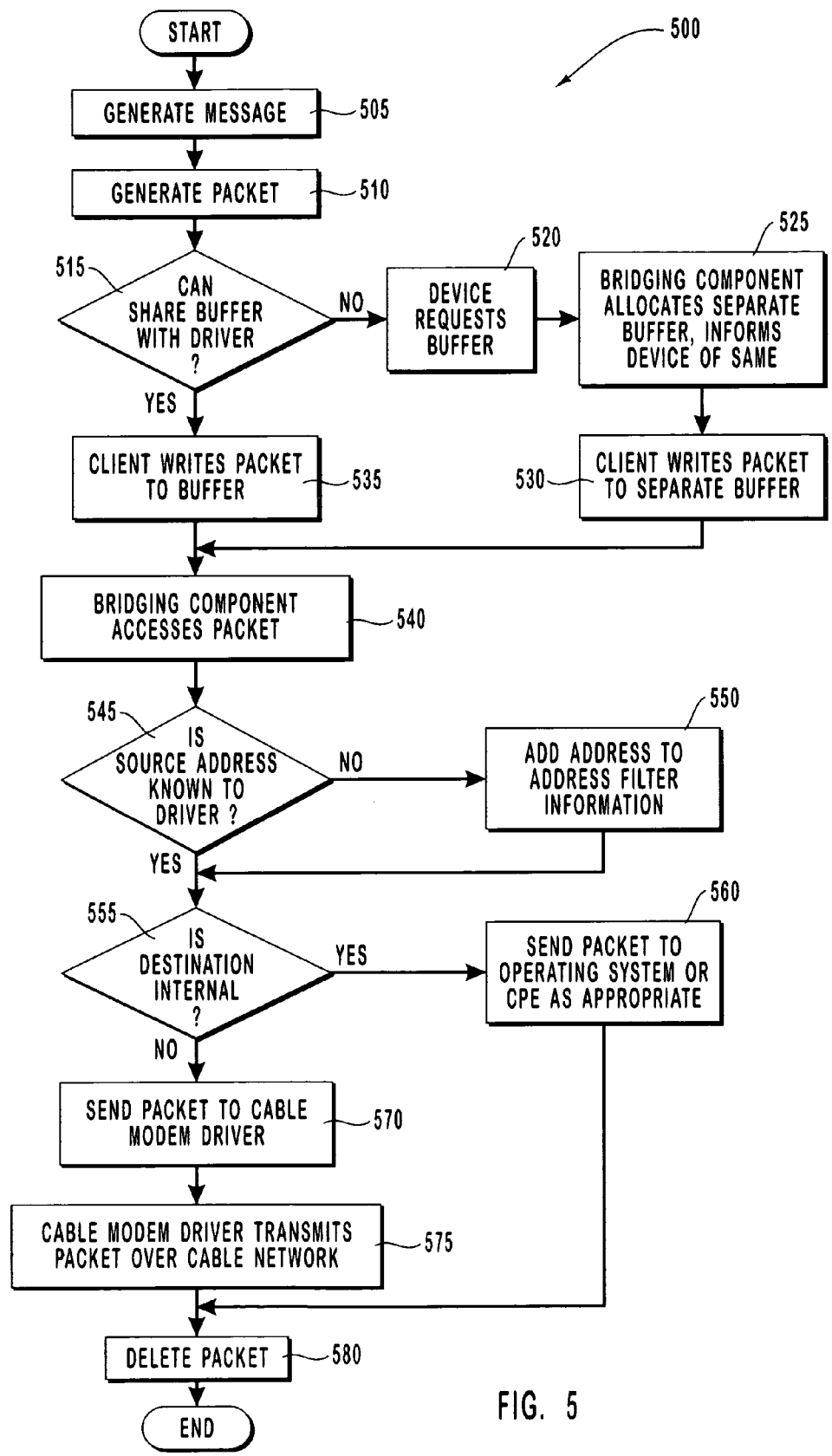
FIG. 5 is a flowchart showing a method for processing an outgoing signal using the computer system of FIG. 4.

FIG. 5 is a flowchart of a method 500 for processing outgoing data. This method will be described with frequent reference to FIG. 4. First, the bridging component 440 receives an outgoing data packet for transmission onto the cable network 130 from a communication device. This step is broken down into steps 505, 510, 515, 520, 525, 530, 535, and 540 of FIG. 5.

In step 505, the communication device, which may be the operating system 450 or one of the items of customer premises equipment 230, generates a message (step 505) to be transmitted over the cable network 130 or to be transmitted internally to the operating system 450 or to one of the items of customer premises equipment 230. Next, a data packet is generated from the message (step 510). If the message is generated by the operating system 450 of the computer system 210, the packet is generated by the computer system protocol stack 445. If the message is generated by one of the items of customer premises equipment 230, the packet is generated by a protocol stack within the appropriate item of customer premises equipment 230.

In one embodiment, the operating system 450 is a Windows® CE operating environment. In this case, an appropriate computer system protocol stack 445 would include a Winsock interface for passing the message from the operating system 450 to the TCP/IP protocol layers for fragmentation of the message into packets. A Virtual MCNS Miniport Driver and a standard network NDIS driver can also be used to move the data down through the computer system protocol stack 445.

If the generating communication device (i.e., the operating system 450 or the customer premises equipment 230) is not capable of sharing a buffer 405 with the cable modem driver 420 (NO in decision block 515), the generating communication device requests that the bridging component 440 allocate a separate buffer 455 (see FIG. 4) within the memory 330 for the client 110 (step 520). The bridging component 440 then allocates memory for the separate buffer 455 and informs the generating communication device of the location of the separate buffer 455 (step 525).

The generating communication device then writes the packet to the separate buffer 455 (step 530). If the generating communication device is capable of sharing the buffer 405 with the cable modem driver 420 (YES in decision block 515), the generating communication device writes the packet 410 to the buffer 405. (step 535).

After the generating communication device has written the packet 410 to the appropriate buffer (step 530 or step 535), the bridging component 440 accesses the packet (step 540) and determines whether the source address of the packet matches the address of any communication devices that have registered with the bridging component 440 (decision block 545). For example, the bridging component 440 may check the address filter information.

If the bridging component 440 determines that the source network address is not included in the address filter information (NO in decision block 545), the bridging component 440 performs the step of adding the source network address to the address filter information 460 (step 550). If the bridging component 440 has determined that it is aware of the source address (YES in decision block 545) or after the new address is added (step 550), the bridging component 440 then determines whether the destination of the packet is internal to the client 110 (decision block 555). Specifically, the internal destination might be the operating system 450 or one of the items of customer premises equipment 230.

If the destination of the packet is internal (YES in decision block 555), the bridging component transmits the packet to the appropriate internal communications device (step 560), and then the packet is deleted (step 580) thereby ending the method 500. If the destination is not internal to the client 110 (NO in decision block 555), the packet is sent to the cable modem driver 420 (step 570). The cable modem driver 420 then causes the cable modem 360 to transmit the packet (step 575). Next, the packet is deleted (step 580) thereby ending the method.

It is notable that the method 500 described above automatically adds new addresses to the address filter information. When a new item of customer premises equipment 230 is added to the client 110, the bridging component 440 may initially be unaware of the address of that new piece of equipment. However, once the new item of customer premises equipment 230 generates and sends an outgoing message over the cable network 130, the bridging component 440 becomes aware of the new address. Thus, the cable modem 360 does not filter out data packets destined for the new item customer premises equipment 230. Thus, the systems and methods of the present invention automatically update address filter information.

While the present invention has been described in the context of cable modems hosted by and integrally included in computers, the invention can also be practiced with cable modems that are external to the computer with which it is directly linked. In this embodiment, a processing component, such as a cable modem driver, monitors the source address of outgoing data packets and adds any source addresses not previously recognized to the address filtering information. Moreover, as used in the claims, a method that is described as being implemented in a processing device and a cable modem associated with the processing device can have acts or steps that are conducted in the processing device, in the cable modem, or in both.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system that automatically registers a new communication device so as to enable delivery of an incoming data packet to the new communication device only when the incoming data packet has a corresponding destination address that is determined to be associated with the new communication device, the computer system comprising:

one or more processors that execute computer-executable instructions;

a cable modem that is hosted by the computer system, the cable modem representing a physical layer of a cable modem protocol stack, wherein the cable modem is connected to at least one communication device and a cable network, and wherein the cable modem is configured for transmitting outgoing data packets from the at least one communication device over the cable network and further is configured for transmitting incoming data packets that are received from the cable network to the at least one communication device;

a media access controller representing a data link layer of the cable modem protocol stack;

a hardware abstraction interface layer between the data link layer and the physical layer of the cable modem protocol stack, the hardware abstraction interface layer comprising an application programming interface configured for separating hardware of the cable modem from software of the cable modem protocol stack;

one or more computer readable storage media storing the computer-executable instructions to be executed by the one or more processors, the computer-executable instructions comprising:

computer-executable instructions for preparing, by the media access controller, an outgoing data packet from the at least one communication device such that the outgoing data packet is compatible with the hardware abstraction interface layer between the data link layer and the physical layer of the cable modem protocol stack, the hardware abstraction interface layer comprising the application programming interface configured for separating hardware of the cable modem from software of the cable modem protocol stack;

computer-executable instructions for transmitting the outgoing data packet from the media access controller to an interface of the hardware abstraction interface layer;

computer-executable instructions for sending, by the interface, the outgoing data packet to the cable modem;

computer-executable instructions for receiving, by the cable modem, the outgoing data packet from the at least one communication device through the interface of the hardware abstraction interface layer, the outgoing data packet having an address that identifies the communication device;

computer-executable instructions for comparing, by the cable modem, the address with a list of addresses that identify any communication devices that have previously been registered with the cable modem;

computer-executable instructions for, upon the cable modem determining that the address is not included in the list, adding the address to the list of addresses, such that the communication device is automatically registered with the cable modem;

computer-executable instructions for, upon the cable modem receiving an incoming data packet from the cable network which includes a destination address, comparing the destination address of the incoming data packet to the list of addresses;

computer-executable instructions for transmitting, by the cable modem through the interface of the hardware abstraction interface layer, the incoming data packet to any of one or more communication devices that have been registered with the cable modem and that are associated with the destination address as determined by the list of addresses; and computer-executable instructions for filtering, by the cable modem, the incoming data packet when the destination address is not associated with any of the one or more communication devices that have been registered with the cable modem, as determined by the list of addresses, and such that the cable modem effectively prevents the data packet from being delivered to any of the one or more communications devices through the cable modem.

2. The computer system according to claim 1, wherein the cable modem comprises a bridging component.

3. The computer system according to claim 2, wherein the computer-executable instructions for receiving the outgoing data packet further comprise:

computer-executable instructions for the communication device writing the outgoing data packet to a buffer accessible by the bridging component associated with the cable modem; and computer-executable instructions for the bridging component accessing the outgoing data packet in the buffer.

4. The computer system according to claim 2, wherein the computer-executable instructions further comprise:

computer-executable instructions for determining that the destination of the outgoing data packet is a communications device that is local to the computer system; and computer-executable instructions for transmitting the outgoing data packet over the cable network.

5. The computer system according to claim 2, wherein the computer-executable instructions further comprise:

computer-executable instructions for determining that the destination of the outgoing data packet is a communications device that is local to the computer system; and computer-executable instructions for transmitting the outgoing data packet to the communications device that is local to the computer system.

6. The computer system according to claim 2, wherein the computer-executable instructions for comparing comprises computer-executable instructions for the bridging component comparing the address with the list of addresses that identify any communication devices that previously have been registered with the bridging component.

7. The computer system according to claim 2, wherein the computer-executable instructions for determining comprises computer-executable instructions for the bridging component determining that the address is not included in the list.

8. The computer system according to claim 2, wherein the computer-executable instructions for adding comprises computer-executable instructions the bridging component adding the address to the list of addresses.

9. The computer system according to claim 2, wherein the computer-executable instructions further comprise computer-executable instructions for the communication device generating the outgoing data packet.

10. The computer system according to claim 1, wherein the computer-executable instructions further comprise:

computer-executable instructions for determining that the communication device cannot share a buffer with the cable modem associated with the cable modem;

computer-executable instructions for a bridging component creating a separate buffer for the communication device; and computer-executable instructions for the communication device writing the outgoing data packet to the separate buffer.

11. The computer system according to claim 1, wherein the computer-executable instructions further comprise:

computer-executable instructions for using the communication device for the first time to communicate over the cable network, so as to generate the outgoing data packet; and computer-executable instructions for adding the address to the list of addresses resulting in the communication device being automatically registered by the cable modem.

12. The computer system according to claim 1, wherein the cable modem comprises at least a portion of the communication device, and wherein the computer-executable instructions further comprise:

computer-executable instructions for using the communication device for a first time to communicate over the cable network after a cable modem driver has been installed in the communication device; and computer-executable instructions for using a processing device for a first time, resulting in the generation of the outgoing data packet.

13. The computer system according to claim 1, wherein the computer-executable instructions further comprise:

computer-executable instructions for recognizing that the destination address matches the address that has been added to the list of addresses; and computer-executable instructions for transmitting the incoming data packet to the communication device in response to recognizing that the destination address matches.

14. The computer system according to claim 1, wherein the computer-executable instructions for receiving the incoming data packet further comprise:

computer-executable instructions for receiving the incoming data packet at the cable modem; and computer-executable instructions for transmitting the incoming data packet to a cable modem driver.

15. The computer system according to claim 1, wherein the cable modem is external to the processing device.

16. A computer system that automatically registers a new communication device so as to enable delivery of an incoming data packet to the new communication device only when the incoming data packet has a corresponding destination address that is determined to be associated with the new communication device, the computer system comprising:
- one or more processors that execute computer-executable instructions;
- a cable modem that is hosted by the computer system, the cable modem representing a physical layer of a cable modem protocol stack, wherein the cable modem is connected to at least one communication device and a cable network, and wherein the cable modem is configured for transmitting outgoing data packets from the at least one communication device over the cable network and further is configured for transmitting incoming data packets that are received from the cable network to the at least one communication device;
- a media access controller representing a data link layer of the cable modem protocol stack;
- a hardware abstraction interface layer between the data link layer and the physical layer of the cable modem protocol stack, the hardware abstraction interface layer comprising an application programming interface configured for separating hardware of the cable modem from software of the cable modem protocol stack;
- one or more computer readable media with the computer-executable instructions to be executed by the one or more processors, the computer-executable instructions comprising:
  - computer-executable instructions for preparing, by the media access controller, an outgoing data packet from the at least one communication device such that the outgoing data packet is compatible with the hardware abstraction interface layer between the data link layer and the physical layer of the cable modem protocol stack, the hardware abstraction interface layer comprising the application programming interface configured for separating hardware of the cable modem from software of the cable modem protocol stack;
  - computer-executable instructions for transmitting the outgoing data packet from the media access controller to an interface of the hardware abstraction interface layer;
  - computer-executable instructions for sending, by the interface, the outgoing data packet to the cable modem;
  - computer-executable instructions for receiving, by the cable modem, the outgoing data packet from the at least one communication device through the interface of the hardware abstraction interface layer, the outgoing data packet having an address that identifies the communication device;
  - computer-executable instructions for comparing, by the cable modem, the address with a list of addresses that identify any communication devices that have previously been registered with the cable modem; and
  - computer-executable instructions for, upon the cable modem determining that the address is not included in the list, adding the address to the list of addresses, such that the communication device is automatically registered with the cable modem.

17. The computer system according to claim 16, wherein the computer-executable instructions further comprise:
- computer-executable instructions for determining whether the destination of the outgoing data packet is local to the computer system;
- computer-executable instructions for transmitting the outgoing data packet over the cable network if the destination is not local; and
- computer-executable instructions for transmitting the outgoing data packet to the destination if the destination is local.

* * * * *